3,491,145
HALOMETHYLMERCAPTO-FLUORENIMINES

Karl Gunther Schmidt, Gunther Mohr, Sigmund Lust, and Gerhart Schneider, Darmstadt, Germany, assignors to E. Merck A.G., Darmstadt, Germany
No Drawing. Filed Mar. 17, 1967, Ser. No. 623,806
Claims priority, application Germany, Mar. 19, 1966, M 68,845
Int. Cl. C07c *159/00;* A01n *9/12*
U.S. Cl. 260—551          30 Claims

ABSTRACT OF THE DISCLOSURE

Halomethylmercapto fluorenimines useful as herbicides and for the total inhibition of the further development of the apical bud.

---

This invention relates to halomethylmercapto fluorenimines and the application of such compounds to plants.

An object of this invention is to provide novel chemical compounds, and processes for their production.

Another object is to provide compositions in solid or liquid form for effecting certain activities in plants, particularly relating to the growth of plants, and especially to the development of the apical bud/shoot tip part thereof.

Upon further study of the specification and claims, other objects and advantages of the present invention will become apparent.

To attain the objects of this invention, there are provided the compounds of Formula I, as follows:

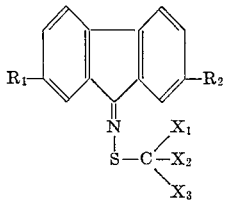

I wherein $R_1$ and $R_2$, being identical or different, each represents H, halogen, OH, lower alkyl of 1–4 carbon atoms, or $NO_2$; and $X_1$, $X_2$, and $X_3$, being identical or different, each represents fluorine, chlorine, or bromine.

The novel compounds of Formula I can also be employed in mixtures with known herbicides and/or plant growth regulators.

The agents of the present invention are unique in their effect upon the development of the shoot tips (apical buds) of plants. These agents, having a substantial tissue-selective effect on division-active and growing tissue, thus exhibit effects not known heretofore.

The activity of the substances of this invention comprises the total inhibition of the further development of the apical bud; this bud blanches chlorotically to an increasing extent and then dies in the course of several weeks. The remainder of the plant, however, remains green and can resume a normal further development from the sites of axillary leaf buds, after a certain period of time, e.g. after 2–7 weeks.

This special effect upon the shoot tip of plants is novel. Although the activity of maleic acid hydrazide (MH) and aminotriazole (ATA) also mainly concerns the shoot tip, the effects thereupon are different. Maleic acid hydrazide, though likewise inhibiting the further development of the shoot tip, when employed in substantially higher concentrations, does not effect the selective killing of this tip. On the other hand, aminotriazole does not at the outset inhibit the further development of the shoot tip, but merely blocks the chlorophyll synthesis in the growing tissue, the latter remaining completely chlorotic. From the following table, the differing activities of these substances can clearly be seen.

| | | Condition of the plants five weeks after application of 2 x 0.02 ml. per plant | | | |
|---|---|---|---|---|---|
| | | Apical Bud/Shoot Tip | | | |
| Active substance | Conc., p.p.m. | Inhibited | Chlorotic | Dying | Remainder of plant |
| Maleic acid hydrazide | 2,000 | + | — | — | Alive, green |
| Aminotriazole | 200 | — | + | + | Do. |
| N-trichloromethylthiofluorenimine-(9) | 200 | + | + | + | Do. |

Thus, the agents of this invention combine special activity characteristics, in a manner not known heretofore.

In many cases, it is advisable to employ the novel compounds of Formula I in combination with herbicides and/or plant growth regulators, since such combinations are generally preferred in the plant protection field.

The compounds of Formula I are novel, the most important species thereof being the N-trichloro-, N-tribromo, and N-trifluoromethylmercapto derivatives of fluorenimine, as well as those derivatives which are substituted in the 2- and/or 7-position. However, those compounds are likewise suitable wherein the residues $X_1$ to $X_3$ represent different halogen atoms, so that it is also possible for the N-atom of the fluorenimine to be provided with mixed halomethylmercapto groups as dichlorofluoro-, chlorodifluoro-, dichlorobromo-, dibromofluoro-, chlorodibromo-, bromodifluoro-, and bromochlorofluoromethylmercapto.

Insofar as the 2- and/or 7-position of the novel compounds is substituted, suitable substituents, in addition to the halogen atoms (F, Cl, Br, and/or I), are also hydroxy, nitro, or lower alkyl groups, in particular methyl, ethyl, n- and isopropyl, as well as n-, iso-, sec.-, and tert.-butyl.

The novel compounds of Formula I can be prepared by various processes. They can be produced, for example, by reacting the correspondingly substituted fluorenimine-(9) or one of the salts thereof with one of the known trihalogen-methyl-sulfenyl chlorides or bromides. Suitable salts are, for example, the metal salts, particularly the alkali salts, such as the Li-, Na-, and K-salts. The fluorenimine-(9) proper is reacted in the presence of a basic condensation agent, such as, for example, in addition to sodium, potassium and lithium amide, also NaOH, KOH, LiOH, $Na_2CO_3$, $NaHCO_3$, sodium ethylate, as well as other appropriate alkali salts, particularly potassium salts. The reaction is conducted in the presence of an inert organic solvent. Suitable are, for example, benzene, toluene, xylene, gasoline, aliphatic hydrocarbons, such as hexane or octane, or ethers, such as tetrahydrofurane and dioxane. The reaction can be carried out at room temperature as well as at elevated temperatures (about 60–150° C.). The reaction times range, depending upon the reaction temperature and solvent employed, between a few minutes and several hours. After cooling the reaction mixture, most of the desired compound crystallizes and can then be isolated and recrystallized.

The novel compounds can also be produced by reacting, for example, an $N^2$-acylated (preferably acetylated) 9-hydrazinofluorene which is, if desired, substituted in the 2- and/or 7-position by $R_1$ and/or $R_2$, with the corresponding trihalogen-methyl-sulfenyl halogenide. Suitably, there is also added in this reaction a basic condensation agent, such as sodium or potassium amide. Otherwise, the reaction conditions correspond to those set out above, as regards the solvents to be used, the reaction times, and the reaction temperatures. The reaction mixture is worked up in a conventional manner.

Moreover, it is also possible to exchange, in the compounds of Formula I, the halogen substituents $X_1$, $X_2$, and $X_3$ against other halogen substituents. Thus, for example, the corresponding monofluorodichloro compound can be obtained from a trichloromethylthiofluorenimine, by reaction with anhydrous hydrofluoric acid. However, if the trichloromethylthiofluorene derivatives are reacted, for example, with hydrogen bromide, there are exchanged, depending upon the selected reaction conditions, 1, 2, or 3 chlorine atoms of this compound against bromine. Normally, the mixtures of these monobromodichloro-, dibromomonochloro-, and/or tribromomethylthiofluorenimino derivatives do not have to be separated for preparing the agents of the present invention. The quantity of a particular bromo compound present in the reaction mixture is substantially dependent upon the reaction time which can vary between 1 and 24 hours.

The reactions are normally conducted at room temperature, but it is, of course, possible to employ higher temperatures. The use of particular solvents is generally not required. Whereas the hydrofluoric acid is employed in the anhydrous state in this reaction, the hydrobromic acid is preferably employed in an aqueous solution which is, however, preferably highly concentrated. Suitable is, for example, an approximately 48% hydrobromic acid (having a constant boiling point). The hydrohalic acids can be added, depending upon the final product desired, either in stoichiometrical proportions or in an excess.

The fluorenone derivatives to be used as the starting materials are often present in a mixture (resulting from the manner in which they were prepared), for example, as a mixture of the 2-halogen- and 2,7-dihalogen-, or the 2-nitro and 2,7-dinitro-compounds. Normally, it is unnecessary to separate these mixtures for preparing the novel active agents for the substances of this invention.

The inhibition or arrest of the further development of plants can be demonstrated, for example, in experiments with Galium aparine. Seedlings of Galium aparine are planted in 8 cm. plastic pots (three to a pot) and treated with the preparation of the active substance in a series of dilutions. Per plant, two droplets of respectively 0.02 ml. are applied to the seedleaves. Three weeks and six weeks after the treatment, the effect is evaluated:

0=undisturbed further development,
1=slight inhibition of development,
2=strong inhibition of development,
3=complete arrest of further development, but living plants,
∅=plants destroyed.

| Duration of experiment | Concentration in percent | | | | | | | |
|---|---|---|---|---|---|---|---|---|
| | 0.002 | 0.005 | 0.01 | 0.02 | 0.05 | 0.1 | 0.2 | 0.5 |
| 21 days | 0 | 1 | 2 | 3 | 3 | 3 | 3 | 3 |
| 42 days | 0 | 1 | 1 | 2 | 2–3 | 3 | 3 | ∅ |

From these values for N-trichloromethylthiofluorenimine, it can be seen that, in the application of small dosages of the active substance, the plants are inhibited and arrested in their further development, but they are not destroyed. The plants survive and can later on return to a normal further development.

The activity of the novel compounds of Formula I can also be seen, for example, from the following experiment wherein the selectively herbicidal properties were tested by spraying plants in the post-germination process. The following plants were used as test plants, in the listed stages of development:

Corn (*Zea mays*), 3 leaves.
Wheat (*Triticum vulgare*), 2 leaves.
Carrot (*Daucus carota*), 1 secondary leaf.
Sugar beet (*Beta vulgaris*, F. *altissima*), 2–4 leaves.
Quickweed (*Galinsoga parviflora*), 4–6 leaves.
Cleavers (*Galium aparine*), 4–6 leaf stalks.
Black nightshade (*Solanum nigrum*), 6–10 leaves.

The active substance (for example, N-trichloromethylthiofluorenimine-(9)) is dissolved in a small amount of acetone and is then mixed with an emulsion concentrate, consisting of 67.5% cyclohexanone, 22.5% xylene, and 10% of commercially available emulsion stabilizers. In all applied dilution stages, a constant ratio of active substance:emulsion concentrate of 1:10 is maintained. In the following table, the effect obtained after 6 weeks from the date of spraying is set forth:

0=no effect, undisturbed growth,
1=weak effect, slight inhibition and/or maceration,
2=stronger effect, plants strongly inhibited and/or partially killed,
3=very strong effect, plants practically destroyed,
4=plants completely destroyed.

| Type of plant | Amount Employed in kg./ha. (ha.=hectare= ca. 2.47 acres) | | | |
|---|---|---|---|---|
| | 2.5 | 5.0 | 12.5 | 25.0 |
| Corn | 0 | 0 | 0 | 0 |
| Wheat | 0 | 0 | 0 | (¹) |
| Carrots | 0 | 1 | 1 | (¹) |
| Sugar beets | 1 | 1 | 1 | (¹) |
| Galinsoga parviflora | 3 | 4 | 4 | 4 |
| Galium aparine | 3 | 3 | 3–4 | 4 |
| Solanum nigrum | 3 | 4 | 4 | ʳ4 |

¹ Not tested.

From these values, it can be seen that the active substance exhibits a good herbicidal effect and makes it possible to combat important weeds in stands of cultivated plants.

The active agents can be processed into all types of preparations customary with respect to plant protective agents or plant combating agents. As additives and fillers, the conventional agents are employed, such as, for example, bole, kaolin, bentonite, powdered shale, talc, chalk, dolomite, or kieselguhr, insofar as solid preparations are involved. For liquid formulations, there are preferably used xylene, petroleum ether, benzine (gasoline), solvent naphtha, petroleum, acetone, cyclohexane, dimethyl formamide, or dimethyl sulfoxide, as the solvent or suspension agent. Emulsion concentrates prepared in this manner can be sold commercially as such. Before use, the emulsion concentrates are conventionally diluted with water.

Of course, it is possible to add wetting agents to the preparations of active agent; such suitable wetting agents are, depending on the particular use thereof, anionic, cationic, or non-ionic surface-active agents. Such wetting agents cannot only be added to the liquid preparations, but they can also be added to pulverized, solid carrier substances, for example, there being obtained a wettable powder which can be applied to the plants either directly or after being shaken up in water.

The concentration of the novel active substances in the compositions of this invention can be varied within wide limits, depending upon the desired effect, the process of application, the time of year, the climatic conditions, and the type and character of the plants. In order to use them as a total herbicide, it is, of course, appropriate to employ somewhat higher concentrations of the active agent than in those cases wherein the plant growth is only to be arrested temporarily. The preparations contain, as the proportion of active substance, generally 0.5–95% by weight. Also when combining the fluorenimine derivatives with herbicides and/or growth-regulating substances, the content of active agent is maintained within these limits.

The quantity to be employed ranges between 0.1 and 25 kg./ha., likewise depending upon the desired effect, the climactic conditions, and the type and characteristics of the plants to be treated.

The novel agents can be employed by treating the ground in the pre-sowing or pre-germination process, or by treating the plants in the post-germination process, by atomization (aerosol mist spraying), spraying, pouring, spreading, dusting, as well as by rubbing, powdering, injecting, infiltration, or soaking plants or plant parts, such as tubers, bulbs, or seeds, as well as by incorporation into the ground.

Insofar as the novel active substances are combined with conventional herbicides and/or with substances regulating plant growth, a large variety of substances can be employed for such combinations, depending upon the desired effect.

The term "herbicidally effective compounds" is to comprise, in this connection, not only the directly phytotoxically active substances, but also, for example, growth-promoting herbicides. Such growth-promoting herbicides are, for example, substituted phenoxyalkane carboxylic acids and the derivatives thereof, such as 2,4-dichlorophenoxyacetic acid, 2-methyl-4-chlorophenoxyacetic acid, 2,4,5-trichlorophenoxyacetic acid, 2,4-dichlorophenoxypropionic acid, 2-methyl-4-chlorophenoxypropionic acid, 2,4,5-trichlorophenoxypropionic acid, (2,4-dichlorophenoxy)-butyric acid, (2-methyl-4-chlorophenoxy) - butyric acid, as well as the salts and esters thereof; furthermore suitable are substituted benzoic acids and other aryl carboxylic acids, as well as arylalkane carboxylic acids and the derivatives thereof, such as 2,3,5-triiodobenzoic acid, 2,3,6-trichlorobenzoic acid; 2-methoxy-3,6-dichlorobenzoic acid, or 2,3,6-trichlorophenylacetic acid; substituted benzonitriles, such as 2,6-dichlorobenzonitrile, 3,5-diiodo-4-hydroxybenzonitrile; aryl phthalamic acids and the derivatives thereof, such as N-naphthyl-(1)-phthalamic acid. Furthermore usable are herbicides without growth-promoting character, such as, for example, substituted phenylurea derivatives, as 3 - (p-chlorophenyl)-1,1-dimethylurea; 3-(3,4'-dichlorophenyl)-1,1 - dimethylurea; N - (4-chlorophenyl)-N'-methoxy-N'-methylurea; N-(3,4-dichlorophenyl)-N'-methoxy-N'-methylurea; N-(4-chlorophenyl)-N'-methyl-N' - isobutynylurea; N-4-(p-chlorophenoxy)-phenyl - N',N'-dimethylurea; N - (3-trifluoromethyl)-phenyl-N',N'-dimethylurea; N-(4-bromophenyl)-N'-methoxy-N'-methylurea; N-phenyl-N'-(2-methylcyclohexyl)-urea; N-phenylcarbamic acids and the derivatives thereof, such as N-phenyl-carbamic isopropyl ester and N-3-chlorophenyl-carbamic acid isopropyl ester; triazole and the derivatives thereof, such as 3-amino-1,2,4-triazole, triazines, such as 2-chloro-4,6-bis-(ethylamino)-s-triazine; 2-chloro-4-ethylamino-6-isopropylamino - s - triazine; 2-chloro-4,6-bis-(iso - propylamino)-s-triazine; 2 - methylmercapto-4,6-bis - (isopropylamino)-s-triazine; 2-methylmercapto - 4 - (3 - methoxypropyl) - amino - 6 - isopropylamino-s-triazine; 2 - methoxy-4-ethylamino-4-isopropylamino-s-triazine; pyridazones, such as 1-phenyl-4-amino-5-chloro-pyridazone-6; 1 - phenyl-4-(α-hydroxy-β', β',β-trichloroethyl)-amino-5-chloro-pyridazone-6; urazils, such as 3-isopropyl-5-bromo-6-methyl-urazil; 3-sec.butyl-5-bromo-6-methyl-urazil; 5-chloro-3-tert. butyl-6-methyl-urazil; 3-cyclohexyl-5,6-trimethylene-urazil; picolinic acid and the derivatives thereof, such as 4-amino-3,5,6-trichloro-picolinic acid; pyridinoles, such as 2,3,5-trichloropyridinole-(4); phthalates, such as 3,6-disodium-endoxohexahydro-phthalate; halogenated fatty acids and the derivatives thereof, such as trichloroacetic acid and 2,2-dichloro-propionic acid; and maleic acid hydrazide and the derivatives thereof. Growth-regulating substances are such substances, for example, as indole-3-alkane carboxylic acids and the derivatives thereof, β-indolyl-butyric acid, gibberellin and the derivatives thereof, such as gibberellic acid (gibberellin A 3) as well as phytokinines and the derivatives thereof, such as 6-(L-furfuryl)-aminopurine (kinetin). Furthermore suitable are also plant-influencing quaternary nitrogen compounds, such as β-chloroethyl - trimethyl-ammonium chloride, (4-hydroxy-5-isopropyl-2-methylphenyl)-trimethylammonium chloride, or [5-isopropyl - 2 - methyl - 4 - (piperidinocarbonyloxy)-phenyl]-trimethylammonium chloride; 1,1'-ethylene-2,2'-dipyridinium dibromide, as well as 1,1'-dimethyl-4,4'-dipyridinium-dimethyl sulfate; the novel agents can likewise be combined with aryl boric acids, and the derivatives thereof, such as phenyl boric acid, and with pronounced growth stimulants, such as urea and purine derivatives.

Particularly suitable are also combinations with the known plant morpho-regulators from the group of the fluorene-9-carboxylic acid derivatives, particularly, for example, 2-chloro-9-hydroxyfluorene carboxylic acid-(9) and the alkali, alkaline earth, ammonium, and substituted ammonium salts thereof, as well as the alkyl, alkenyl, and alkynyl esters thereof, and 9-hydroxyfluorene carboxylic acid-(9) and the alkali, alkaline earth, ammonium, and substituted ammonium salts, as well as the alkyl, alkenyl, and alkynyl esters thereof.

The economical applicability of the agents of this invention offers a great variety of possibilities. The novel properties of the new active substances make it possible to employ the novel agents on a broad scale for controlling the growth and development of plants. Thus, the novel agents are excellent for a chronologically limited inhibition of the growth of plants, without damaging the later further development thereof. Of course, if required, they can also be used for the selective or total destruction of weeds. Under certain conditions of application, the novel agents are tolerated by important cultivated plants, while undesired weeds in such cultures can be eliminated. Further specific fields of application comprise, for example, the chemical growth attenuation, i.e. the gentle suppression of plants, for example, on lawn areas, ditch embankments, dams, and roadsides. Moreover, they are also suitable for influencing specific growth or development processes, for example, for prolonging the bud rest and for delaying the flowering time (for example, acceleration of maturing or delay of development), for controlling the number of flowers and fruit produced by the plant (for example, thinning of fruit), for defoliation, to save gardening steps in plantations and thus work (for example, preventing additional shoots in tobacco or the formation of runners in strawberries), or for improving the durability of harvested products (for example, preventing the sprouting of tubers and roots during storage). The novel agents according to this invention exhibit their greatest effectiveness when applied to the parts of plants above ground, i.e. in the so-called post-germination process. However, these agents are likewise effective upon the plant when used underground, by way of the root, or upon germinating seeds.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

(A) PREPARATION OF THE ACTIVE AGENTS

Example I 9 g. fluorenimine-(9) and 8.5 g. sodium bicarbonate are stirred with 50 ml. toluene for 4 hours at about 100° C. The reaction mixture is filtered off in the hot state from the undissolved residue. The filtrate is mixed with 9.3 g. trichloromethylsulfenyl chloride, at a temperature of 50–60° C. After the reaction mixture has been allowed to stand at room temperature overnight, the orange-colored precipitate is filtered off and the filtrate concentrated under reduced pressure. The remaining oily residue (15 g.) crystallizes upon cooling and is recrystallized from ethyl acetate. There are obtained 13 g. (79% of theory) of N-trichloromethylthio-fluorenimine-(9) in the form of yellow crystals, M.P. 112–114° C.

With the use of correspondingly substituted halomethylsulfenyl chlorides, the following compounds are analogously produced:

N-dichlorofluoromethylthio-fluorenimine-(9),
N-chlorodifluoromethylthio-fluorenimine-(9),
N-trifluoromethylthio-fluorenimine-(9),
N-tribromomethylthio-fluorenimine-(9),
N-dibromochloromethylthio-fluorenimine-(9), and
N-monobromodichloromethylthio-fluorenimine-(9).

By reacting correspondingly substituted fluorenimines with the halomethylsulfenyl chlorides pertaining thereto, the following compounds are obtained in an analogous manner:

2,7-dichloro-N-trichloromethylthio-fluorenimine-(9), M.P. 219–220° C.,
2-chloro-N-chlorodifluoremethylthio-fluorenimine-(9),
2-chloro-N-tribromomethylthio-fluorenimine-(9),
2,7-dichloro-N-dichlorofluoromethylthio-fluorenimine-(9),
2-bromo-N-trichloromethylthio-fluorenimine-(9),
2-bromo-N-tribromomethylthio-fluorenimine-(9),
2,7-dibromo-N-trichloromethylthio-fluorenimine-(9),
2,7-dibromo-N-dichlorofluoromethylthio-fluorenimine-(9),
2-iodo-N-trichloromethylthio-fluorenimine-(9),
2-fluoro-N-trichloromethylthio-fluorenimine-(9),
2-hydroxy-N-trichloromethylthio-fluorenimine-(9),
2-hydroxy-N-tribromomethylthio-fluorenimine-(9),
2-nitro-N-trichloromethylthio-fluorenimine-(9),
2-nitro-N-tribromomethylthio-fluorenimine-(9),
2-nitro-N-dichlorofluoromethylthio-fluorenimine-(9),
2,7-dinitro-N-trichloromethylthio-fluorenimine-(9),
2-methyl-N-trichloromethylthio-fluorenimine-(9),
2-ethyl-N-trichloromethylthio-fluorenimine-(9),
2-isopropyl-N-trichloromethylthio-fluorenimine-(9), and
2,7-diisopropyl-N-trichloromethylthio-fluorenimine-(9).

Example II 21 g. 2-chloro-fluorenimine-(9) are refluxed for 4 hours with 10 g. sodium bicarbonate in 300 ml. toluene. After cooling of the reaction mixture, the insoluble components are filtered off, and the filtrate is mixed with 11.2 ml. trichloromethylsulfenyl chloride. After allowing the mixture to stand overnight at room temperature, the thus-obtained precipitate is vacuum-filtered from sodium chloride, and the obtained filtrate is concentrated. The residue (29 g.) is recrystallized from ethyl acetate. There are obtained 27 g. (75% of theory) of 2-chloro-N-trichloromethylthio-fluorenimine-(9) in the form of yellow needles, M.P. 155° C.

Analogously, there are obtained, from 2,7-dichlorofluorenimine-(9), 2,7-dichloro-N-trichloromethylthiofluorenimine-(9) in a 72% yield, M.P. 219–220° C.; and from 2,7-dinitrofluorenimine-(9), 2,7-dinitro-N-trichloromethylthio-fluorenimine-(9).

Example III 23.7 g. 1-acetyl-2-fluorenyl-(9)-hydrazine are mixed under stirring in 600 ml. dry dioxane with 7.0 g. sodium amide. The reaction mixture is boiled under reflux until the ammonia is completely separated. Thereafter, 8.0 ml. trichloromethylsulfenyl chloride are added dropwise. The reaction mixture is refluxed for an additional 25 minutes and poured on ice, after cooling. After about 1 hour, the thus-obtained precipitate is vacuum-filtered. The filtrate is boiled with activated charcoal, and the solution is filtered in the hot state. After several hours, if desired upon cooling, N - trichloromethylthio-fluorenimine-(9) precipitates. Yield: 13.5 g. (41% of theory), M.P. 119–120° C.

(B) COMPOSITIONS CONTAINING ACTIVE AGENTS

Example 1

| | Percent |
|---|---|
| Emulsion concentrate | 25 |
| N-trichloromethylthio-fluorenimine-(9) | 25 |
| Dimethylformamide | 5 |
| Xylene | 45 |
| Alkylolamine sulfonate | 25 |

In place of N-trichloromethylthio-fluorenimine-(9), the following compounds can be used in the same manner:

N-dichlorofluoromethylthio-fluorenimine-(9),
2-chloro-N-chlorodifluoromethylthio-fluorenimine-(9),
2-bromo-N-trichloromethylthio-fluorenimine-(9),
2-fluoro-N-trichloromethylthio-fluorenimine-(9),
2-hydroxy-N-trichloromethylthio-fluorenimine-(9), and
2-isopropyl-N-trichloromethylthio-fluorenimine-(9).

Example 2

| | Percent |
|---|---|
| Emulsion concentrate | 12.5 |
| N-tribromomethylthio-fluorenimine-(9) | 12.5 |
| Xylene | 82.5 |
| Alkylaryl sulfonate+sorbitol polyoxyethylene ether | 5 |

In place of N-tribromomethylthio-fluorenimine-(9), the following compounds can be used in the same manner:

N-chlorodifluoromethylthio-fluorenimine-(9),
2-chloro-N-tribromomethylthio-fluorenimine-(9),
2,7-dibromo-N-trichloromethylthio-fluorenimine-(9),
2-hydroxy-N-tribromomethylthio-fluorenimine-(9), and
2-methyl-N-trichloromethylthio-fluorenimine-(9).

Example 3

| Sprayable powder: | Percent |
|---|---|
| Monofluorodichloromethylthio-fluorenimine-(9) | 25 |
| Alkyl naphthalene sulfonate | 0.5 |
| Sulfite waste liquor powder | 10 |
| Silicic acid | 3 |
| Bole | 61.5 |

In place of monofluorodichloromethylthio-fluorenimine-(9), the following compounds can be used in the same manner:

fluorobromochloromethylthio-fluorenimine-(9),
2-nitro-N-trichloromethylthio-fluorenimine-(9),
2-nitro-N-tribromomethylthio-fluorenimine-(9), and
2,7-dinitro-N-trichloromethylthio-fluorenimine-(9).

Example 4

| Sprayable powder: | Percent |
|---|---|
| Dibromomonochloromethylthio-fluorenimine-(9) (technical product) | 50 |
| Oleic acid-N-methyl tauride | 10 |
| Silicic acid | 3 |
| Siliceous chalk | 37 |

In place of dibromomonochloromethylthio-fluorenimine-(9), there can be used in the same manner:

N-trifluoromethylthio-fluorenimine-(9),
N-tribromomethylthio-fluorenimine-(9),
2-iodo-N-trichloromethylthio-fluorenimine-(9),
2-nitro-N-dichlorofluoromethylthio-fluorenimine-(9), and
2-ethyl-N-trichloromethylthio-fluorenimine-(9).

Example 5

Mixed sprayable powder: Percent
2-methyl-4-chlorophenoxyacetic acid isooctyl ester _____ 15
N-trichloromethylthio-fluorenimine-(9) _____ 5
Bole _____ 72
Silicic acid _____ 3
Emulsifier _____ 5

In place of N-trichloromethylthio-fluorenimine-(9), there can be employed in the same manner:

N-dibromochloromethylthio-fluorenimine-(9),
2-bromo-N-tribromomethylthio-fluorenimine-(9), and
2,7-diisopropyl-N-trichloromethylthio-fluorenimine-(9).

Example 6

Emulsion concentrate: Percent
2-chloro-N-trichloromethylthio-fluorenimine-(9)_ 35
Polyoxyethylene sorbitol ester+alkylaryl sulfonate _____ 5
Solvent naphtha _____ 60

Example 7

Mixed sprayable powder: Percent
3,5-diiodo-4-hydroxybenzonitrile _____ 15
2-bromo-N-monochlorodibromomethylthio-fluorenimine-(9) _____ 5
Emulsifier _____ 10
Bole _____ 70

Example 8

Emulsion concentrate: Percent
2,7-dibromo-N-trichloromethylthio-fluorenimine-(9) _____ 50
Solvent naphtha _____ 45
Emulsifier _____ 5

Example 9

Mixed sprayable powder: Percent
2-chloro-9-hydroxyfluorene-carboxylic acid-(9) methyl ester _____ 25
N-trichloromethylthio-fluorenimine-(9) _____ 25
Emulsifier _____ 12
Bole _____ 38

Example 10

Mixed sprayable powder: Percent
Dimethylamine salt of 2-chloro-9-hydroxy-fluorene-carboxylic acid-(9) _____ 5
Monofluorodichloromethylthio-fluorenimine-(9)_ 30
Emulsifier _____ 5
Silicic acid _____ 3
Bole _____ 57

Example 11

Mixed sprayable powder: Percent
n-Butyl ester of 9-hydroxyfluorene-carboxylic acid-(9) _____ 25
2-chloro-N-trichloromethylthio-fluorenimine-(9)_ 25
Emulsifier _____ 8
Silicic acid _____ 2
Bole _____ 40

The preceding examples can be repeated with similar success by substituting the generically and specifically described reactants and operating conditions of this invention for those used in the preceding examples.

What is claimed is:
1. A compound of the formula:

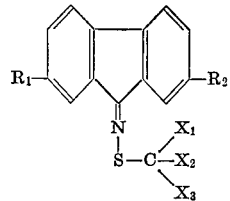

wherein
$R_1$ and $R_2$ represent H, halogen, OH, lower alkyl of 1-4 carbon atoms, or $NO_2$; and
$X_1$, $X_2$, and $X_3$ represent fluorine, chlorine, or bromine.

2. A compound as defined by claim 1 wherein said compound is N-trichloromethylthiofluorenimine-(9).
3. A compound as defined by claim 1 wherein said compound is N-dichlorofluoromethylthiofluorenimine-(9).
4. A compound as defined by claim 1 wherein said compound is N-chlorodifluoromethylthiofluorenimine-(9).
5. A compound as defined by claim 1 wherein said compound is N-trifluoromethylthiofluorenimine-(9).
6. A compound as defined by claim 1 wherein said compound is N-tribromomethylthiofluorenimine-(9).
7. A compound as defined by claim 1 wherein said compound is N-dibromochloromethylthiofluorenimine-(9).
8. A compound as defined by claim 1 wherein said compound is N-monobromodichloromethylthiofluorenimine-(9).
9. A compound as defined by claim 1 wherein said compound is fluorobromochloromethylthiofluorenimine-(9).
10. A compound as defined by claim 1 wherein said compound is 2-chloro-N-trichloromethylthiofluorenimine-(9).
11. A compound as defined by claim 1 wherein said compound is 2-chloro-N - chlorodifluoromethylthiofluorenimine-(9).
12. A compound as defined by claim 1 wherein said compound is 2-chloro-N-tribromomethylthiofluorenimine-(9).
13. A compound as defined by claim 1 wherein said compound is 2,7-dichloro-N-trichloromethylthiofluorenimine-(9).
14. A compound as defined by claim 1 wherein said compound is 2,7 - dichloro-N-dichlorofluoromethylthiofluorenimine-(9).
15. A compound as defined by claim 1 wherein said compound is 2,7-dibromo-N-trichloromethylthiofluorenimine-(9).
16. A compound as defined by claim 1 wherein said compound is 2 - iodo - N-trichloromethylthiofluorenimine-(9).
17. A compound as defined by claim 1 wherein said compound is 2,7-dibromo-N-trichloromethylthiofluorenimine-(9).
18. A compound as defined by claim 1 wherein said compound is 2,7-dibromo - N - dichlorofluoromethylthiofluorenimine-(9).
19. A compound as defined by claim 1 wherein said compound is 2 - iodo-N-trichloromethylthiofluorenimine-(9).
20. A compound as defined by claim 1 wherein said compound is 2-fluoro-N-trichloromethylthiofluorenimine-(9).
21. A compound as defined by claim 1 wherein said compound is 2-hydroxy-N-trichloromethylthiofluorenimine-(9).
22. A compound as defined by claim 1 wherein said compound is 2 - hydroxy-N-tribromomethylthiofluorenimine-(9).

23. A compound as defined by claim 1 wherein said compound is 2-nitro-N-trichloromethylthiofluorenimine-(9).

24. A compound as defined by claim 1 wherein said compound is 2-nitro-N-tribromomethylthiofluorenimine-(9).

25. A compound as defined by claim 1 wherein said compound is 2-nitro-N-dichlorofluoromethylthiofluorenimine-(9).

26. A compound as defined by claim 1 wherein said compound is 2,7-dinitro-N-trichloromethylthiofluorenimine-(9).

27. A compound as defined by claim 1 wherein said compound is 2-methyl-N-trichloromethylthiofluorenimine-(9).

28. A compound as defined by claim 1 wherein said compound is 2-ethyl-N-trichloromethylthiofluorenimine-(9).

29. A comopund as defined by claim 1 wherein said compound is 2-isopropyl-N-trichloromethylthiofluorenimine-(9).

30. A compound as defined by claim 1 wherein said compound is 2,7-diisopropyl-N-trichloromethylthiofluorenimine-(9).

References Cited

UNITED STATES PATENTS 3,285,929   11/1966   Klauke et al. _____ 260—551

HENRY R. JILES, Primary Examiner

H. I. MOATZ, Assistant Examiner

U.S. Cl. X.R.

71—2.3

UNITED STATES PATENT OFFICE
CERTIFICATE OF CORRECTION

Patent No. 3,491,145 January 20, 1970

Karl Gunther Schmidt et al.

It is certified that error appears in the above identified patent and that said Letters Patent are hereby corrected as shown below:

Column 10, line 53, "2,7-dibromo-N" should read -- 2-Bromo-N line 56, "2-oido-N-trichloromethylthiofluorenimine" should read -- 2-Bromo-N-tribromomethylthiofluorenimine --.

Signed and sealed this 13th day of October 1970.

(SEAL)
Attest:

Edward M. Fletcher, Jr.
Attesting Officer

WILLIAM E. SCHUYLER, JR.
Commissioner of Patents